3,310,360
CINEMATOGRAPHIC APPARATUS
Brian Claude Jarvis, Stanley George Fitch, and Leonard Henry Howes, Temple Fields Harlow, Essex, England, assignors to Moviecol Sales Limited, Temple Fields, Harlow, Essex, England, a British company
Filed Sept. 22, 1964, Ser. No. 398,181
Claims priority, application Great Britain, Sept. 30, 1963, 38,500/63
15 Claims. (Cl. 352—104)

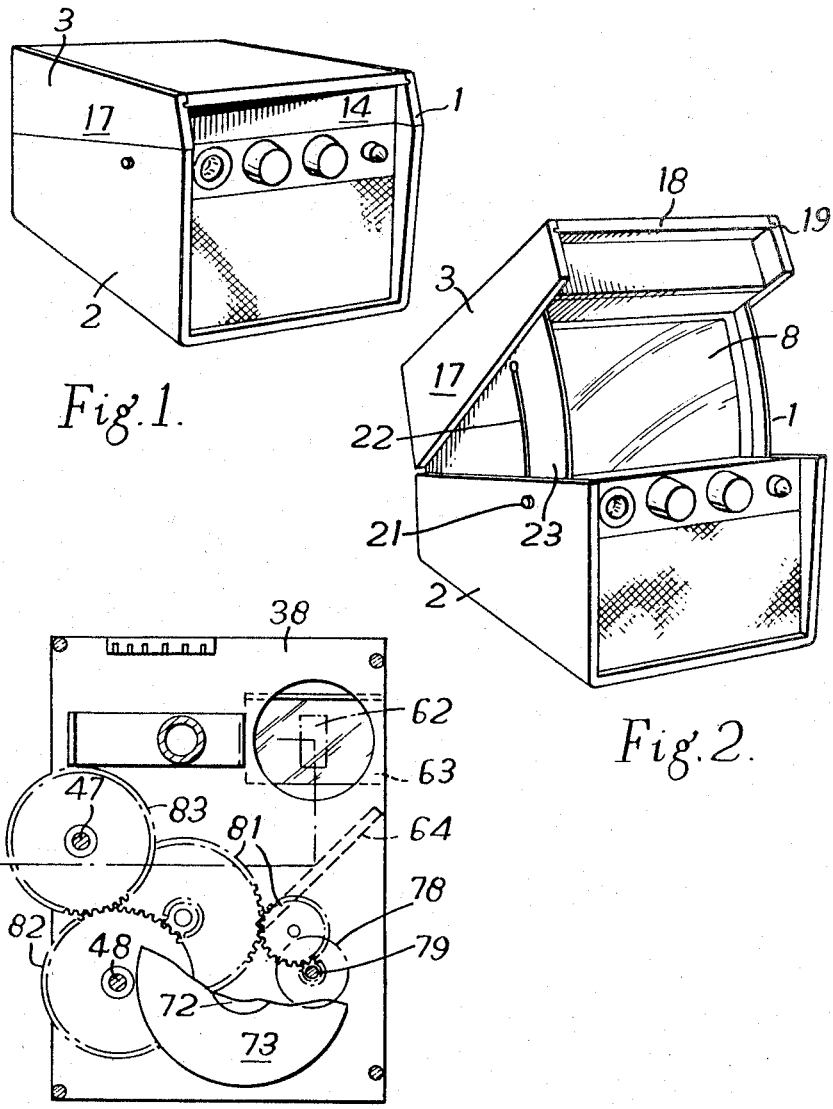

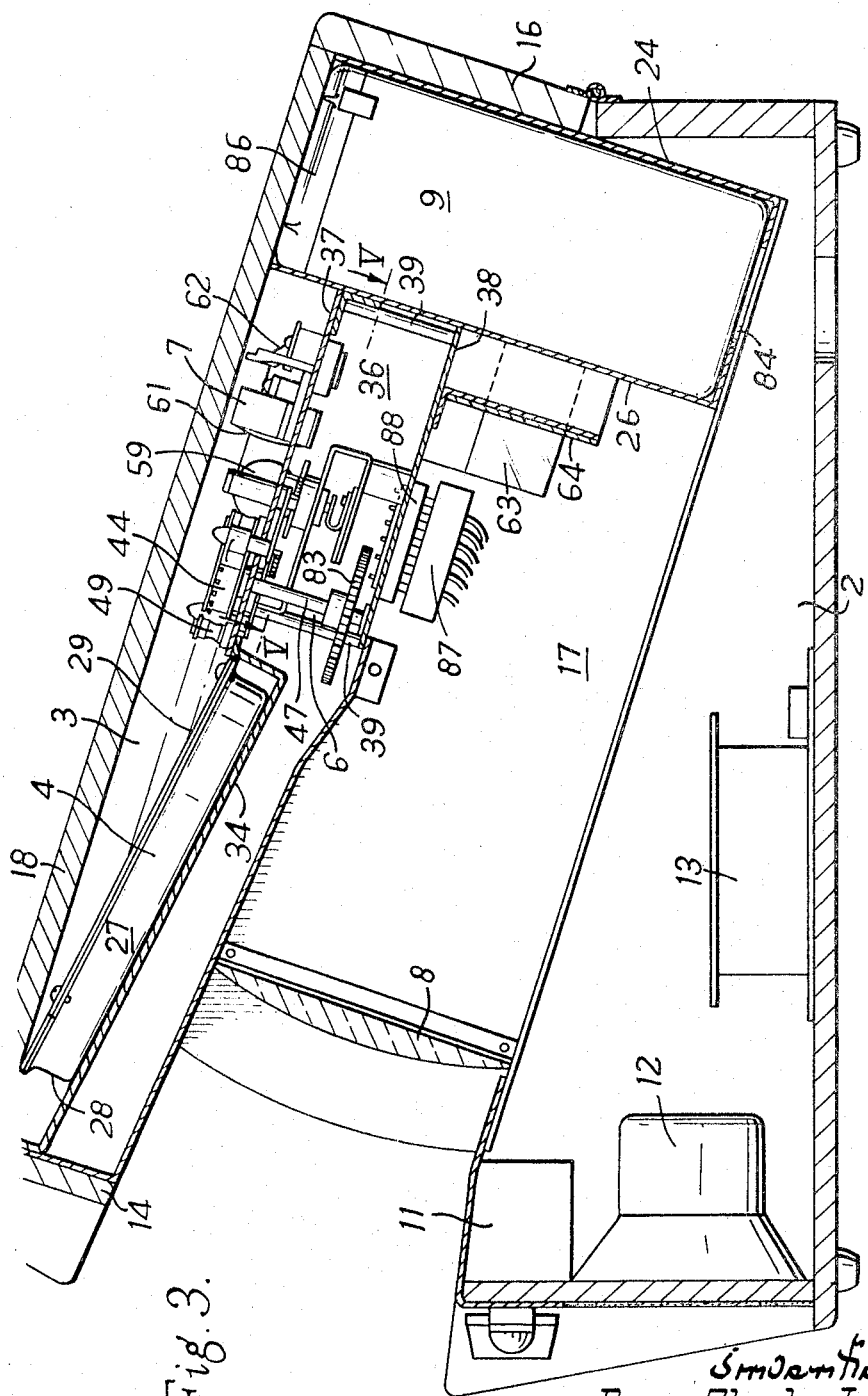

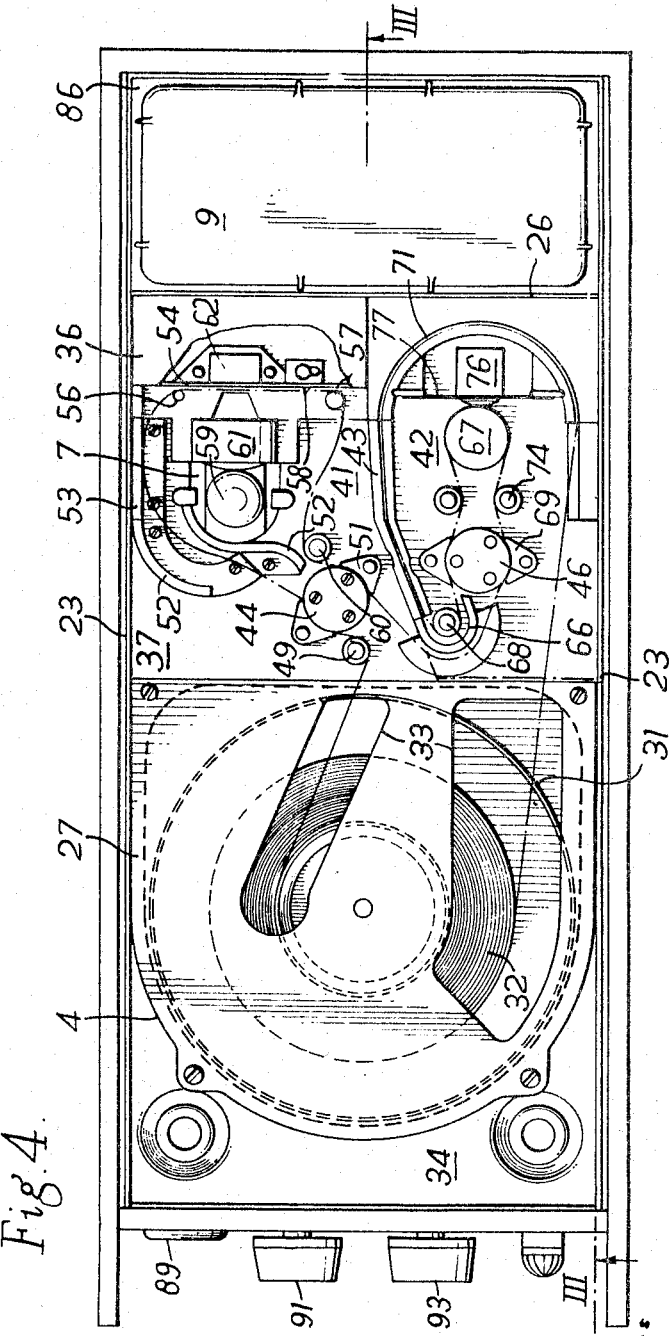

This invention relates to cinematographic apparatus.

It is often impossible for a sales representative to carry a complete range of his company's products, either due to their size or to their variety, and it has therefore been proposed to provide him with a portable cinematographic projector so that he can display a film relating to these products at interviews with prospective customers.

Explanation of the goods shown on the film can be given verbally, but clearly it is desirable that the apparatus should include its own audio-system providing a commentary on the display. Since interviews may take place out doors, or under other conditions in which a screen is not easily erected, it is also preferable to provide a screen within the apparatus itself. To permit use out doors it is also desirable that the apparatus should include its own battery, in which case it is desirable to include a battery charger which the representative can use for re-charging overnight.

Clearly there are many other uses for portable cinematographic projectors, for educational purposes, for example.

The present invention consists in cinematographic apparatus comprising a box having an open-topped base portion and a lid portion which is hinged to the base portion for movement from a lowered position, in which it closes the base portion, to a raised position, in which it can be secured relative to the base portion, a viewing screen fixedly secured relative to the lid portion and pendantly supported therefrom so as to be visible from outside the box when the lid portion is in its raised position and to be received within the base portion when the lid is in its lowered position, and an optical projection system supported by the lid portion and including a source of light, optical means for projecting light from the source along an optical path to the screen, film storage means, and means for driving film from the storage means along an extended path during which frames of the film are sequentially disposed in the optical path and images thereof projected on to the screen.

Preferably the lid portion of the box includes a top cover which is readily removable to allow access to the interior of this portion from above. In this event the cover may be slidably received in elongated slots respectively provided in a pair of opposed side walls of the lid portion. Further, the extended path along which film is driven from the film storage means may extend over an upper surface of a supporting plate element within the lid portion, and the film driving means may be arranged below the supporting plate element, whereby removal of the top cover allows access to the film for replacement purposes.

The apparatus may include a sub-chassis upon which are mounted the source of light, the optical means, and the film driving means, the sub-chassis being mounted within the lid portion and being removable therefrom as a unit.

The invention will now be described, by way of example, with reference to the accompanying drawings, in which:

FIGURE 1 is a perspective view of a cinematographic apparatus according to the invention with the lid portion in a lowered position;

FIGURE 2 is a perspective view of the apparatus of FIGURE 1 with the lid portion raised;

FIGURE 3 is a longitudinal section of the apparatus taken along the line III—III of FIGURE 4 and with the lid portion raised;

FIGURE 4 is a plan view of the apparatus with the top cover removed from the lid portion; and FIGURE 5 is a section taken along the line V—V of FIGURE 3.

The cinematographic apparatus illustrated in the drawings is suitable for use by sales representatives in that it is portable, is battery-operated, and includes its own battery charger which permits re-charging overnight from a mains supply. The apparatus also includes its own viewing screen and audio-system.

The apparatus is disposed within a plywood box 1 which is approximately 14 inches long, 6 inches wide and 6 inches deep and, as indicated in FIGURES 1, 2 and 3, is formed of a base portion 2, whose depth decreases uniformly from front to rear, and a lid portion 3, which is correspondingly deeper at the rear. As indicated in FIGURE 3 a film storage means 4, film driving means 6, an optical projection system 7, a viewing screen 8 and a battery 9 are all supported by the lid portion 3 whilst an amplifier 11, loudspeaker 12 and a battery charger 13 are mounted within the base portion 2.

Referring now to FIGURE 3, the lid portion 3 of the box is formed of a front wall 14, rear wall 16 and two side walls 17 together with a top cover 18 which is slidably received in elongated slots 19 in the side walls 17 (see FIGURE 2). The lid portion 3 is hinged to the base portion 2 at the rear of the box so that opening can be effected by moving the front of the lid portion upwardly and rearwardly relative to the base portion. After movement through approximately 25° the lid portion is automatically locked in a fixed position relative to the base portion (as shown in FIGURE 2) by engagement of a spring-loaded catch member 21 on the base portion with a slot 22 in a side plate mounted on the lid portion, this being the operative position of the apparatus.

Removing the top cover 18 of the lid portion 3 provides access to the parts of the apparatus which are supported by the lid portion and in particular allows direct access to the film storage means 4, an extended path over which the film is driven for projection purposes, thereby permitting the film to be replaced easily, and to the battery 9.

These parts of the apparatus which are supported by the lid portion 3 are mounted on an aluminum chassis which includes two side plates 23 (see FIGURES 2 and 4) secured to the interior of the lid portion and adjacent to respective side walls 17 thereof and a rear plate 24 adjacent to its rear wall 16. The rear plate 24 is of depth equal to that of the interior of the box so that its lower part extends downwardly below the side walls 17 of the lid portion and is received within the base portion 2 when the box is closed. The upper portions of the side plates 23 extend from front to rear of the lid portion 3 whilst their leading edges extend downwardly to the bottom of the lid portion, rearwardly for about 10% of the length of the box, and then downwardly to the bottom of the base portion 2 when the box is closed. Extending between these side plates 23, towards the rear of the box, is an upstanding partition plate 26 also of depth substantially equal to that of the box.

Referring to FIGURES 3 and 4, the film storage means 4 is disposed at the forward end of the lid portion 3 and consists of a cassette 27 as disclosed in our co-pending application Ser. No. 398,373, filed Sept. 22, 1964. Essentially this cassette comprises a container having a base portion 28 and a lid 29, and a coil supporting plate 31 which is pendantly supported from the lid, is rotatable about its axis, and is provided with an upstanding central core around which a coil 32 of film is wound. Apertures 33 are provided in the lid for the passage of film from the centre of the coil 32 out of the container and back into the container to the periphery of the coil. The cassette 27 is supported on a supporting plate 34 which extends between the two side plates 23 of the chassis, the upper front edge of the cassette being immediately below the slidable top cover 18 of the lid, from whence its upper surface slopes downwardly and rearwardly. This inclined mounting enables easy removal and entry of the film.

Between the cassette 27 and the partition plate 26 is a sub-chassis 36 which includes two vertically spaced horizontal supporting plate elements 37 and 38, respectively, secured together by four upstanding pillars 39. In its mounted position the sub-chassis 36 is secured to the partition plate 26 and the supporting plate 34 for the cassette 27 with its upper plate element 37 level with the upper rear edge of the cassette and its lower plate element 38 approximately level with the lower edges of the side walls 17 of the lid portion 3. It can be removed from the lid portion by unscrewing screws which secure it to the partition plate 26 and support plate 34 and then sliding the sub-chassis upwardly.

The upper plate element 37 of the sub-chassis 36 supports those elements of the apparatus which define extended paths for film in its travel to and from the cassette 27 for projection purposes. Supported on the lower plate element 38 are the means for driving the film along these paths.

Referring now to FIGURE 4 of the drawings, the space between the upper plate element 37 of the sub-chassis and the top cover 18 of the lid portion 3 is divided into two compartments 41 and 42, respectively, by a central guide means 43 secured to the upper surface of the upper plate element. For driving film from the cassette 27, along extended paths in respective compartments 41 and 42, and back to the cassette 27, two sprocketed driving rollers 44 and 46, respectively, are mounted at the upper ends of respective driving spindles 47 and 48 (see FIGURE 5) which extend upwardly through the upper plate element 37.

A first of the driving rollers 44 is disposed close to the front of the upper plate element 37 and to the left of the central guide means 43 when viewed from the front of the box. Film from the centre of the cassette 27 travels rearwardly round a freely rotatable roller 49 and then to the left hand side of this first driving roller 44 so that its base is presented to the roller and its perforations are engaged by the sprockets thereon. After this first engagement with driving roller 44 the film follows a first extended path within the left hand compartment 41, as viewed from the front of the box, during which frames of the film are sequentially disposed on the optical axis of the optical projection system 7, and then returns to re-engage the first roller 44 at a location on its periphery remote from the first engagement of film therewith. Two spring-loaded pressure shoes 51 mounted on the upper supporting plate element 37 bear against the film and retain it in engagement with the first driving roller 44.

From its first engagement with roller 44 film initially passes between two curved guide surfaces 52 which are spaced apart so as to define a wide passage through which film travels to the left and rearwardly into compartment 41. One of the guide surfaces 52 is continued rearwardly as a guide surface 53, which defines one side of compartment 41, whilst the rear of the compartment is defined by a rear guide surface 54 at right angles to surface 53. Freely rotatable guide rollers 56 and 57 are disposed at opposite ends, respectively, of guide surface 54, and spaced therefrom, and between roller 57 and driving roller 44, is a further roller 60.

The length of film between the first and second engagements thereof with the driving roller 44 is so arranged that were the film path solely determined by the inherent resilience of the film this path would be substantially circular, a part lying to the left of guide surface 53 and a part rearwardly of surface 54.

The presence of surfaces 53 and 54, however, prevents film from adopting this circular path and instead film is forced, by virtue of its inherent resilience, into following a path within part of which it bears against guide surface 53, within a second part lies between surface 54 and roller 56, and over a third part bears against and conforms to the shape of rear surface 54. From the latter surface film follows a curved path round rollers 57 and 60 to driving roller 44.

Projecting forwardly from the rear guide surface 54, and disposed approximately midway between the side of the box and the central guide means 43, is a small film stop 58 which is engageable with the perforations formed in the film. Upon engagement of a perforation with this stop 58 the portion of film which is bearing against the rear guide surface 54 and is in the section of film path which is disposed rearwardly of the stop, i.e. to the left as seen from the front of the box, is held stationary. An aperture of area substantially equal to the area of a frame in the film is formed in the part of the rear guide surface 54 which is contacted by this stationary film and the optical axis of the optical projection system 7 extends through the centre of this aperture in a direction normal to the plane of the rear guide surface 54.

It will be appreciated that in operation of the device the first driving roller 44 is rotated at a constant speed by the driving means 6, described hereinafter. Accordingly, film is continuously fed into the left hand compartment 41 by its engagement with the left hand side of the roller 44 and is removed therefrom at an equal rate by its engagement with the right hand side of the roller 44.

With a perforation in the film engaged by the stop 58 the continuous supply of film to the left hand side of compartment 41 causes the length of film in the rearward part of the film path, between the roller 44 and stop 58, to be increased, thereby causing film to be urged more strongly into contact with surfaces 53 and 54 and further, causing an increasing force to be exerted longitudinally of the film, in a direction towards film stop 58. At the same time the reduction in the length of film in the forward part of the path, between stop 58 and the second engagement of film with roller 44, causes the curvature of the sections of film between guide surface 54 and roller 57 and between roller 57 and driving roller 44 to be reduced. The tension of film in these sections of the path increases.

Eventually the curvature of the section of film between guide surface 54 and roller 57 has been so reduced that the film is lifted from the stop 58. As soon as this happens the longitudinal force on the film which has built up in the section of film path rearwardly of the stop 58 and the tension in the part of the film forwardly of the stop causes the film to slip rapidly along the guide surface 54. This slipping continues until the succeeding perforation is engaged by the stop 58.

The process is then repeated, resulting in frames of the film being sequentially disposed on the optical axis of the optical projection system 7.

It will be appreciated that the angle between guide surfaces 53 and 54 can be greater or less than 90° as long as it is such that film is caused to bear against the two surfaces and lead to a build up in the longitudinal force on the film in the manner described above.

To provide an image of each frame when it is disposed adjacent to the aperture in the rear guide surface 54 an electric lamp 59 and condensing lens 61 are mounted on the upper supporting plate element 37, forwardly of the aperture in the rear guide surface 54. These components are arranged to provide a beam of light which passes through the frame to a small, upper mirror 62 disposed rearwardly of the rear guide surface and inclined at an angle of 45° to the vertical. As indicated by FIGURES 3 and 5 light is reflected downwardly from the mirror 62 through an object lens (not shown in the drawings) mounted in an aperture in the upper plate element 37 of the sub-chassis 36 and through an aperture in the lower plate element 38 on to a small lower mirror 63 which depends from the lower plate element. This lower mirror 63 is also inclined at an angle of 45° to the vertical so as to reflect the light in a horizontal direction, transversely of the box, to a second lower mirror 64, also depending from the lower plate element 38. The second mirror 64 is disposed in a vertical plane and inclined at an angle of 45° to the longitudinal axis of the box 1 so that light reflected therefrom travels forwardly along the central axis of the box.

Depending from the lower part of the lid portion 3, and a short distance from the front of the box 1, is the glass viewing screen 8 which has a ground rear surface upon which an image of the frame is received.

The screen 8 and the two lower mirrors 63 and 64 are received in the base portion 2 of the box when the lid portion is closed and part of the space between the mirrors and the screen is taken up by the battery charger 13. When the lid portion is moved upwardly to its open position, as seen in FIGURE 3, the battery charger is no longer in a position to prevent light from mirror 64 reaching the screen.

With the lid portion 3 secured in this open position the lower edge of the screen 8 is located substantially level with the upper front edge of the base portion 2 and the screen extends upwardly and rearwardly from this edge at a convenient angle for viewing. It will be noted that although tilting the lid portion 3 to this open position has caused the screen 8 to be inclined to the vertical the optical projection system 7 is also secured relative to the lid portion and has therefore been tilted by a corresponding amount. Light from the lamp 59 therefore remains correctly focussed on the screen 8 to give a sharp image of the film.

Referring to FIGURE 4, from the first driving roller 44 the film path extends rearwardly to engage the second driving roller 46 travels along a second extended path within the right hand compartment 42, wherein an audio signal is obtained, re-engages the second driving roller 46 at a location spaced from the first engagement of film therewith, and is finally returned to the periphery of the cassette 27.

In threading film from the cassette 27 around the two extended paths, care must be taken to ensure that a predetermined number of frames are disposed between the location in the left hand compartment 41 where the film crosses the optical path of the optical projection system 7 and the location in the right hand compartment 42 where an audio signal is generated so that an audio corresponding to the display shown on a particular frame is picked up at the same time as that frame is displayed.

After its second engagement with the first driving roller 44 film initially travels forwardly and slightly towards the right of the box 1 and then round a semi-circular guide 66 from which it emerges to travel in a rearward direction and along the second extended path within the right hand compartment 42, as mentioned above. Film is fed into this second path by engagement with the right hand side of the second driving roller 46, from which it travels rearwardly round a rotatable sound drum 67, forwardly to re-engage the second driving roller 46 on its left hand side remote from its first engagement therewith, and then forwardly to a further freely rotatable guide roller 68. Two spring loaded pressure shoes 69 bear against the film to retain it in contact with the second driving roller. From the guide roller 68 the film travels rearwardly along a narrow channel in the central guide means 43 and then back to the cassette 27 via a narrow channel in a semi-circular moulding 71 which is provided at the rear of the right hand compartment 42.

The sound drum 67 is mounted on a spindle 72 which extends upwardly through the upper plate element 37 of the sub-chassis 36 and carries a large flywheel 73 at its lower end (see FIGURE 5). Two spring-loaded tension rollers 74 bear inwardly against the respective lengths of film between the second driving roller 46 and the drum 67 to maintain this part of the film in tension. Adjacent to the drum 67, and forwardly thereof, is an audio pick-up head 76 which faces the base side of the film upon which the sound track is formed. The pick-up head 76 is mounted on a transversely extending spring strip 77 which urges it forwardly so as to bear against the film in contact with the drum. Signals generated by the head 76 are passed to the remainder of the audio system which is disposed in the base portion 2 of the box 1 and is described hereinafter.

The side and rear guide surfaces 53 and 54, respectively, in the left hand or video compartment 41 and the two guides 52 disposed forwardly of this compartment are made of moulded plastic material. Each is formed with a longitudinally extending recess which is so arranged that when the film bears against the guide it is only contacted at its upper and lower edges. This reduces friction and wear on the film.

Referring to FIGURE 5, the two sprocketed driving rollers 44 and 46 which drive the film along the respective extended paths are driven by an electric motor 78 which is secured to the lower side of the lower supporting plate element 38. An output shaft 79 of this motor extends upwardly through the lower plate element 38 and drive is transmitted through a reduction gear train 81 to a gear wheel 82 secured to the lower end of the spindle 48 upon which the second driving roller 46 is mounted. This latter gear meshes with a similar gear wheel 83 at the lower end of the first driving roller spindle 47. This gearing arrangement is such that the two driving rollers 44 and 46 are rotated at exactly the same constant speed when the motor 78 is energised.

The side plates 23 of the chassis within the lid portion 3, the partition plate 26, rear plate 24 and a base plate 84 define a compartment 86 at the rear of the lid portion for receiving the battery 9. This battery, like the film storage means 4 and film paths, is accessible for replacement purposes by sliding the top cover 18 of the lid portion forwardly in its slots 19.

Electrical connections extend from terminals on the top of the battery 9 a short distance down opposite sides thereof and when the battery is placed into its compartment these connections engage respective electrical contacts secured to side walls of the compartment. Current from the battery is supplied to the various electrical components of the apparatus via leads which extend forwardly through apertures in the partition plate 26.

For supplying current to the lamp 59 of the optical projection system 7, the driving motor 78 and the audio pick-up head 76 leads extend from the battery compartment 86 via a main on/off switch in the base portion 2 of the box and a plug 87 (see FIGURE 3) secured to the left hand side plate 23 of the chassis in the lid portion 3. A corresponding socket 88 is provided on the lower supporting plate element 38 of the sub-chassis 36 so that when the sub-chassis is pushed downwardly into its mounted position the plug and socket are engaged.

As shown in FIGURE 3, at the front of the base portion 2 of the box is the loudspeaker 12 and mounted immediately above this is the amplifier 11 therefor. The amplifier 11 receives an input signal from the audio pick-up head 76 in the lid portion of the box and amplifies this signal to provide an output signal for the speaker 12. Current for the amplifier 11 is also supplied by the battery 9 via the above main switch and an amplification control switch 93 is provided on the front of the base portion.

Also disposed within the base portion 2, between the screen 8 and lower mirrors 62 and 63 of the lid portion 3 when the latter is closed, is the battery charger 13. A socket 89 provided on the front of the base portion 2 enables connection of the apparatus to a main supply for charging the battery 9.

The main switch mentioned above is disposed within the base portion 2 of the box and is arranged to be operated by opening and closing the lid portion 3. With the lid portion in its lowered position the switch is engaged by the lower edge of the left hand side plate 23 of the chassis and is retained in an open position, thereby disconnecting the battery 9 from the audio and video systems and the driving motor. Raising the lid portion to its open position operates the switch and causes current to be supplied from the battery to energise the audio and video systems. On the front of the base portion 2 is a motor switch 91 also connected between the battery 9 and the motor 78. With this switch 91 in its "on" position opening the lid portion 3 also causes operation of the motor, thereby causing film to be driven along the extended paths. By moving the switch 91 to its "off" position the motor 78 is de-energised, however, and a single frame of the film can be viewed.

Finally, a remote control switch can be plugged into the socket 89 on the front of the base portion 2 and, with the motor switch 91 in its "off" position, can be used to control the driving motor.

We claim:

1. Self-contained apparatus for viewing motion picture film on a translucent screen, of the type comprising a light source, optical means defining an optical axis extending from the light source to the translucent screen, and means for advancing motion picture film from a coil thereof past the optical axis, said apparatus being characterized by the following:
   (A) the apparatus is housed in a box which comprises
      (1) a base portion that is deeper at its front than at its rear,
      (2) a lid portion having a top wall and which is deeper at its rear than at its front, and
      (3) hinge means connecting the lid and base portions at their rear to provide for swinging motion of the lid portion between a lowered position in which the box is closed and a raised operative position in which the front of the lid portion is spaced above the front of the base portion;
   (B) the screen is secured to the lid portion near the front thereof with the top of the screen spaced below the top wall of the lid portion, so that the screen spans the space between the base and lid portions when the lid portion is in its raised position;
   (C) a coil of film is supported in the lid portion, between the top of the screen and the top wall;
   (D) the light source is located behind the coil and is supported by the lid portion;
   (E) said means for advancing film from the coil past the optical axis is mounted in the lid portion, behind the coil; and
   (F) said optical means is mounted in the lid portion.

2. The apparatus of claim 1, wherein said coil of film is endless and is contained in a cassette having substantially flat top and bottom walls overlying the flat sides of the coil, with a loop of the film passing through the top wall of the cassette and connecting with the innermost and outermost convolutions of the coil, further characterized by the fact that: said cassette closely underlies the top wall of the lid portion at a small inclination thereto such that the top wall of the cassette diverges rearwardly and downwardly from the top wall of the lid portion so that said loop can extend rearwardly from the cassette substantially parallel to the top wall of the lid portion.

3. The apparatus of claim 1, further characterized by the fact that: said top wall of the lid portion is readily removable from the remainder of the lid portion to permit access to the coil of film and the light source.

4. The apparatus of claim 1, further characterized by: a battery carried in the lid portion at the rear thereof and projecting a substantial distance downwardly into the base portion.

5. The apparatus of claim 1, further characterized by:
   (A) a speaker mounted in the base portion of the box, at the front thereof; and
   (B) an amplifier mounted in the base portion of the box behind the speaker.

6. The apparatus of claim 5, further characterized by the following:
   (A) the amplifier is spaced behind the speaker in the base portion of the box; and
   (B) the screen is fixed to the lid portion substantially perpendicular to said top wall thereof and spaced behind the front of the lid portion so that when the lid portion is in its closed position the screen projects down into the base portion between the speaker and the amplifier.

7. The apparatus of claim 1, further characterized by: a sub-chassis in the lid portion comprising a pair of plates that are disposed substantially parallel to said top wall and spaced different distances below the same, the upper of said plates supporting the light source and guide means for guiding film from the coil past the optical axis, and the lower of said plates supporting a motor and a gear train for film drive means by which film is advanced.

8. The apparatus of claim 7, wherein the optical means include a condenser lens mounted on the upper plate and arranged to project light from the source on to a frame of the film, a first mirror mounted on the upper plate for reflecting light which passes through the frame downwardly below the upper plate, and mirror means mounted on the lower plate for reflecting light from the first mirror to the screen.

9. The apparatus of claim 8, wherein the light source and the first mirror are offset from a central, longitudinal axis of the box and the mirror means include two mirrors which are pendantly supported from the lower plate, one mirror being arranged to reflect light from the first mirror transversely of the box to the central axis thereof and the other mirror being arranged to reflect this light forwardly to the screen.

10. Self-contained apparatus for viewing transparencies in the nature of motion picture film and transparent slides, of the type comprising a light source, a translucent screen, means for disposing a transparency in a predetermined relationship to the light source and the screen, and optical means for projecting an image of the transparency onto the screen, said apparatus being characterized by:
   (A) a box in which the apparatus is housed and which comprises complementary base and lid portions hingedly connected at the rear of the box for relative swinging between box open and box closed positions, and each of said portions providing one of a pair of opposite walls of the box, one of said portions having substantial depth at its front in the direction normal to its said wall;
   (B) means fixing the screen to the other of said portions of the box, near the front thereof and with the screen at all times substantially normal to said wall of said other portion so that the screen is received in the first designated portion when the box is closed and is established in a predetermined position, visible between said portions from the front of the box, when the box is opened; and
   (C) means on said other portion securing in fixed relation thereto
      (1) the light source,
      (2) the means for disposing at transparency in a predetermined relationship to the light source, and
      (3) the optical means
   so that the elements which determine the focus upon the screen of an image on the transparency at all times remain in fixed relationship to one another.

11. The apparatus of claim 10 wherein said other portion of the box is the lid portion thereof, further characterized by:
   said one wall of the lid portion comprising a top cover which is readily removable to provide for access to the interior of the lid portion.

12. The apparatus of claim 11 further characterized by:
   (A) motion picture film storage means carried by said lid portion beneath said top cover;
   (B) a supporting plate in the lid portion disposed generally parallel to said one wall thereof and spaced inwardly from the same;
   (C) means on said supporting plate defining an extended path along which film can travel from said storage means past said optical means; and
   (D) film drive mechanism carried by and disposed beneath said supporting plate.

13. The apparatus of claim 12 further characterized by:
   said film storage means being mounted in an upper portion of the lid portion, forward of said supporting plate, so as to be accessible upon removal of the top cover.

14. The apparatus of claim 12, further characterized by:
   mirror means carried by the lid portion and disposed behind and beneath said supporting plate to receive light from above the supporting plate and reflect it downwardly and forwardly beneath the same and toward the screen.

15. The apparatus of claim 12, further characterized by:
   the supporting plate comprising part of a sub-chassis removably carried by the lid portion and upon which are mounted the light source, the optical means, and the film drive mechanism.

References Cited by the Examiner
UNITED STATES PATENTS

| 2,498,895 | 2/1950 | Mueller et al. | 88—24 X |
| 2,525,552 | 10/1950 | Kingston | 352—104 X |
| 2,847,902 | 8/1958 | D'Incerti | 88—24 |
| 2,880,646 | 4/1959 | Brothers | 88—24 |
| 3,173,330 | 3/1965 | Parker | 88—24 |

JULIA E. COINER, *Primary Examiner.*

NORTON ANSHER, *Examiner.*

V. A. SMITH, *Assistant Examiner.*